2,826,589
Patented Mar. 11, 1958

2,826,589
PROCESS FOR THE PRODUCTION OF SOLVENT-STABLE ALPHA- AND GAMMA-FORMS OF METAL-FREE PHTHALOCYANINE

Fritz Muehlbauer, Erwin Plankenhorn, and Robert Zell, Ludwigshafen (Rhine), Germany, assignors to Badische Anilin- & Soda-Fabrik Aktiengesellschaft, Ludwigshafen (Rhine), Germany No Drawing. Application February 21, 1955
Serial No. 489,748

Claims priority, application Germany February 25, 1954

8 Claims. (Cl. 260—314.5)

This invention relates to an improved process for the production of solvent-stable alpha- and gamma-forms of metal-free phthalocyanine.

Metal-free phthalocyanine is known to exist in three modifications which are conveniently named the alpha-, beta- and gamma-modifications, respectively. Whereas the coarse crystalline beta-modification which is weak in color can be converted by a special grinding process into a finely divided, color strong beta-form which is stable to organic solvents, in particular aromatic solvents such as are customary in the production of lacquers, it has hitherto been impossible in a manner which is satisfactory technically to render the alpha- and gamma-modifications stable to solvents but these forms are converted by contact with the said solvents into the coarse crystalline beta-form which is less strong in color and more greenish blue than the initial forms, so that their use in conjunction with lacquers containing organic solvents is impossible; this reduction in color strength and change in shade is also very deleteriously noticeable when coloring rubber or plastics.

We have now found that solvent-stable alpha- and gamma-forms of metal-free phthalocyanine can be prepared by bringing the crude beta-form or the non-solvent-stable alpha- or gamma-forms of metal-free phthalocyanine into a state of fine dispersion by conventional methods in admixture with small amounts of a stabilizer consisting of a metal-free phthalocyanine which is substituted from 1 to 4 times by negative substituents, in particular by halogen atoms or nitro groups, or of a correspondingly substituted aluminum, chromium, iron, cobalt, nickel, copper or zinc phthalocyanine. It is preferred to admix only such amounts of said stabilizers that the shade of color of the final product is not or only unappreciably changed.

As such stabilizers for the alpha- or gamma-form there are suitable in particular the phthalocyanines of the said kind which are negatively substituted in one or more 4-positions but the phthalocyanines of the said kind substituted in 3-positions and especially mixtures of phthalocyanines substituted in 3- and 4- positions also yield useful results. The amount of stabilizer necessary is relatively small and may be the smaller the higher is its degree of substitution. The best results are obtained when in the final mixture there is 1 substituent of the said kind for about 4 to 6 molecules of the metal-free unsubstituted phthalocyanine to be stabilized, or in other words when in admixture with 1 molecule of a tetra-, tri-, di or mono-substituted phthalocyanine there are, respectively, 18 to 20, 13 to 14, 8 to 10 or 4 to 5 molecules of the metal-free unsubstituted phthalocyanines. For practical reasons, tetra-substituted phthalocyanines are used as far as possible as stabilizers because thereby the smallest possible amounts of substituted phthalocyanine are introduced into the metal-free phthalocyanine whereby the risk of a displacement of the shade of color is at a minimum and, when negatively substituted metal phthalocyanines are added, the metal content of the mixture is kept at a minimum.

The production of the said mixtures can also be carried out by introducing negative substituents to the desired extent into the metal-free phthalocyanine, for example by treating such a phthalocyanine with a halogenating agent, such as elementary chlorine or bromine, or phosphorus pentachloride, until the mixture formed has the desired composition and then if desired bringing the resultant mixture into a state of fine dispersion. It is more advantageous to mix the metal-free phthalocyanine with the necessary amount of such a stabilizer and then finely to disperse this mixture. If the crude beta-form of the metal-free phthalocyanine has been used, it is necessary to convert this form by conventional methods into the alpha- or gamma-form. Thus for example by treating the mixture of stabilizer and beta-form with 60 to 70% sulfuric acid the alpha-form is obtained or with 75 to 100% sulfuric acid the gamma-form.

When starting from a mixture of a metal-free phthalocyanine consisting mainly of the alpha-form and a stabilizer, the fine dispersion of the mixture can be carried out with 60 to 70% sulfuric acid, whereby the alpha-form is retained, whereas by treatment of this mixture with 70 to 100% sulfuric acid the alpha-form is converted into the gamma-form; on the other hand the stabilized gamma-form can be brought into fine dispersion with the aid of 75 to 100% sulfuric acid while retaining the gamma-form, whereas by treatment with 60 to 70% sulfuric acid the stabilized gamma-form is converted into the alpha-form. Thus the desired solvent-stable alpha- or gamma-form can be obtained from whatever form of the metal-free phthalocyanine is available.

When the fine dispersion is to be effected by treatment with sulfuric acid, there may also be used, instead of the metal-free phthalocyanine to be stabilized, metal phthalocyanines, such as the phthalocyanines of sodium, potassium, beryllium, magnesium, calcium, barium, strontium, cadmium, mercury or lead, which are converted into the metal-free phthalocyanine with withdrawal of the metal by mineral acids, in particular sulfuric acid.

Solvent-stable alpha- and gamma-forms of metal-free phthalocyanine are obtainable for the first time according to the present invention. By solvent-stable we mean a phthalocyanine dyestuff of which the color strength is substantially unaffected by boiling for 2 hours with benzene or xylene.

The following examples will further illustrate this invention but the invention is not restricted to these examples. The parts are parts by weight.

EXAMPLE 1

Into a suspension of 100 parts of the solvent-instable alpha-form of metal-free phthalocyanine in 1000 parts of trichlorbenzene, after the addition of 3 parts of antimony pentachloride, there is led with rapid stirring at 140° C. a slow current of about 10 to 20 parts of chlorine. After the end of the reaction, the dyestuff is filtered off by suction, washed with methanol, boiled up with dilute hydrochloric acid, again filtered by suction, washed with water and dried. It is then dissolved in cold concentrated sulfuric acid, the acid adjusted to 62% by the addition of water and the suspension stirred for some hours at room temperature. The suspension is then stirred into water and the dyestuff filtered off by suction, washed with water, dried and comminuted. The powder thus obtained contains 1.9% of chlorine, which corresponds to 1 atom of chlorine for 4.5 molecules of the metal-free phthalocyanine. It has the good color strength of the alpha-form of the metal-free phthalocyanine but it does not change its color strength even after boiling for a long time in benzene, toluene or xylene.

Phthalic anhydride may be used instead of trichlorobenzene.

EXAMPLE 2

A mixture of 26 parts of the solvent-instable alpha-form of metal-free phthalocyanine and 10 parts of phosphorus pentachloride is heated first for about an hour at 75° C. and then for another hour while slowly raising the temperature to 100° C. When the reaction is ended, any phosphorus chloride still present is decomposed with water, the mixture strongly diluted with water, boiled up, the precipitate filtered off by suction, washed neutral with water and dried. The dyestuff obtained contains 2.1% of chlorine which corresponds to 1 atom of chlorine to about 4.8 molecules of metal-free phthalocyanine. It shows the X-ray diagram of the alpha-form of the metal-free phthalocyanine but it does not change in color strength upon boiling with organic solvents. If necessary the dyestuff can be brought into further fine dispersion by treatment with about 62% sulfuric acid.

If there is used as initial material the solvent-instable gamma-form of the metal-free phthalocyanine, the solvent-stable gamma-form is obtained.

EXAMPLE 3

Into a suspension of 50 parts of the solvent-instable alpha- or gamma- or even the crude beta-forms of metal-free phthalocyanine in 500 parts of a 62% sulfuric acid there is introduced a solution of 4 parts of a metal-free phthalocyanine containing 19.6% of chlorine (obtained by heating for 2 hours at 80° C. an intimate mixture of 50 parts of the alpha- of gamma-forms of metal-free phthalocyanine and 300 parts of phosphorus pentachloride) in 40 parts of concentrated sulfuric acid and then 23 parts of water are added. The whole is stirred for about 16 hours at room temperature, the reaction mixture is poured into water, the separated dyestuff filtered off by suction, washed with water and dried. There are obtained 53 parts of a metal-free phthalocyanine of the alpha-form which is stable to organic solvents.

EXAMPLE 4

50 parts of a solvent-instable alpha- or gamma-form or of the crude beta-form of low color strength of metal-free phthalocyanine are stirred into 500 parts of 62% sulfuric acid. After the addition of the amount of stabilizer necessary for the production of solvent stability in the form of a mixture of copper phthalocyanines chlorinated one, two, three or four times in 3- or 4-position, dissolved in ten times the amount of concentrated sulfuric acid, which is then adjusted to 62% by the addition of water, the whole is stirred for some time and the reaction mixture then worked up as usual. The following table shows the maximum amount of the individual stabilizers necessary in order to produce fastness to solvents. At the same time the table shows the chlorine and copper contents of the mixtures as well as the molar ratio and the weight ratio between the stabilizers and the metal-free phthalocyanine.

Table

| Copper phthalocyanine chlorinated in the 3- or 4-positions | Metal-free phthalocyanine, parts | Chlorine content, percent | Copper content, percent | Molar ratio | Weight ratio |
|---|---|---|---|---|---|
| 16 parts monosubstituted | 50 | 1.42 | 2.52 | 1:3.7 | 1:3.7 |
| 8 parts disubstituted | 50 | 1.52 | 1.36 | 1:7.9 | 1:6.3 |
| 6 parts trisubstituted | 50 | 1.66 | 1.0 | 1:11.1 | 1:8.3 |
| 4 parts tetrasubstituted | 50 | 1.46 | 0.64 | 1:17.5 | 1:12.5 |

In all cases solvent-stable dyestuffs of the alpha-form are obtained, as results from X-ray analysis. From the table it may be seen that for reasons of economy the use of the mono-, di- and tri-substituted copper phthalocyanines should be avoided as much as possible, and use restricted to the tetra-substitution product, for the admixture of 16 parts of mono-chlorinated copper phthalocyanine in any case already displaces the shade of color of the greenish-blue metal-free phthalocyanine markedly towards blue. The copper content of the end dyestuffs obtained with mono-, di- or tri-substituted copper phthalocyanines is relatively high. A reduction in the amount of stabilizer reduces the degree of solvent-fastness of the end dyestuff without however entirely destroying it. By raising the amount of stabilizer above the maximum amount necessary, the solvent-fastness of the end dyestuff is retained but the displacement of the shade of color associated therewith is very noticeable.

EXAMPLE 5

A solution of 5 parts of 4.4′.4″.4′″-tetranitrocopper phthalocyanine (prepared for example by the urea process from the readily accessible 4-nitrophthalimide) in 50 parts of concentrated sulfuric acid is stirred into 500 parts of 62% sulfuric acid. After adding 21 parts of water, 50 parts of a solvent-instable alpha- or gamma-modification of metal-free phthalocyanine are stirred in. After stirring for about 16 hours, the dyestuff is worked up in the usual way. 53 parts of the alpha-form of phthalocyanine are obtained as a soft powder which has a very good solvent fastness both in boiling benzene and boiling xylene. The copper content of the dyestuff is about 0.5%.

EXAMPLE 6

A mixture of 50 parts of the solvent-instable beta-form of metal-free phthalocyanine and 4 parts of 4.4′.4″.4′″-tetrachlorocopper phthalocyanine is dissolved in 341 parts of sulfuric acid monohydrate at 0° to 5° C. As soon as a homogeneous solution has been formed, there are added 210 parts of water slowly while cooling, whereby the concentration of the sulfuric acid is reduced to 62%, and the whole is stirred for about 16 hours at room temperature. The dyestuff powder obtainable after the usual working up is the alpha-form of the metal-free phthalocyanine which contains 18.6% of nitrogen, 1.3% of chlorine and 0.60% of copper, i. e. 1 copper atom for 14 phthalocyanine molecules. The resultant dyestuff has an excellent fastness to solvents.

EXAMPLE 7

A solution of 4 parts of 4.4′.4″.4′″-tetrachlorocobalt phthalocyanine in 40 parts of sulfuric acid monohydrate is stirred into a mixture of 50 parts of a solvent-instable alpha-form of metal-free phthalocyanine in 500 parts of 62% sulfuric acid and then 20 parts of water are added to the mixture. After stirring for about 16 hours at room temperature the dyestuff paste is stirred in hot water, the deposited dyestuff is filtered off by suction, washed neutral, dried and ground. The dyestuff thus obtained is completely stable to solvents and contains 18.66% of nitrogen, 1.4% of chlorine and 0.6% of cobalt.

If equivalent parts of tetrachlorphthalocyanines of aluminum, chromium, manganese, iron, nickel or zinc are used instead of the abovementioned stabilizer, solvent-fast metal-free phthalocyanines are likewise obtained.

EXAMPLE 8

In Examples 1, 3, 4, 5, 6 and 7, the stabilization of the metal-free phthalocyanine is carried out in 62% sulfuric acid so that the end product is in each case a solvent-stable alpha-form of the metal-free phthalocyanine no matter what modification was used as initial material. If 75 to 100% sulfuric acid is used instead of 62% sulfuric acid a gamma-form of metal-free phthalocyanine is obtained which is completely solvent-stable.

EXAMPLE 9

An intimate mixture of 50 parts of the alpha-, beta-, or gamma-modifications of metal-free phthalocyanine and 4 parts of 4.4'.4''.4'''-tetranitrocopper phthalocyanine is dissolved in 500 parts of sulfuric acid monohydrate while stirring at 0° to 5° C. and further stirred for about 2 hours. After stirring the solution into ice water, filtering by suction the deposited dyestuff, washing until neutral, rinsing with dilute ammonia, boiling with 5% of a dispersing agent for an hour, filtering by suction, drying and grinding, there are obtained 53 parts of a gamma-modification of metal-free phthalocyanine which neither flocculates nor recrystallizes by boiling with organic solvents.

The same stabilizing action is obtained by the addition of corresponding amounts of the 4.4'.4''.4'''-tetranitrophthalocyanines of aluminum, chromium, manganese, cobalt, nickel, iron or zinc.

EXAMPLE 10

A solution of 5 parts of 4.4'.4''.4'''-tetrachlorcopperphthalocyanine in 50 parts of concentrated sulfuric acid is stirred into a suspension of 60 parts of calcium phthalocyanine in 600 parts of 18% hydrochloric acid and the mixture is boiled for 5 hours. It is then diluted with hot water to about twice the volume and the dyestuff is filtered off by suction while hot, washed with hot water and dried. The gamma-form of the metal-free phthalocyanine thus obtained is more reddish and of greater color strength than the alpha-form and is fast to solvents.

Other tetrahalogen- or 4.4'.4''.4'''-tetranitro-phthalocyanines of aluminum, chromium, manganese, iron, cobalt, nickel or zinc may be used with the same result.

EXAMPLE 11

Into a solution of 4 parts of 4.4'.4''.4'''-tetranitrocopper phthalocyanine in 40 parts of concentrated sulfuric acid there are stirred 570 parts of 62% sulfuric acid and then 57 parts of disodium phthalocyanine, the whole then being stirred for another 16 hours. The viscous suspension is then stirred into 5000 parts of hot water and the dyestuff is filtered off by suction, washed free from acid with hot water, washed for a short time with dilute ammonia solution and finally again with water, dried and ground. About 54 parts of the alpha-form of a metal-free phthalocyanine are obtained which is completely stable to solvents.

Instead of disodium phthalocyanine there may be used with the same result equivalent amounts of other metal phthalocyanines which give up their metal upon treatment with strong acids, as for example the phthalocyanines of calcium, magnesium, beryllium, cadmium, mercury or lead. Similarly, instead of 4 parts of 4.4'.4''.4'''-tetranitro-copper phthalocyanine there may be used the corresponding amounts of a tetrahalogenated phthalocyanine of copper, aluminum, chromium, manganese, cobalt, nickel, iron or zinc.

By using concentrated sulfuric acid or, better, sulfuric acid monohydrate instead of 62% sulfuric acid, the gamma-form of a metal-free phthalocyanine is obtained which is also completely stable to solvents and does not flocculate.

What we claim:

1. An improved process for the production of a solvent-stable phthalocyanine pigment selected from the group consisting of alpha-modified and gamma-modified metal-free phthalocyanine which comprises treating an admixture of a member of the group consisting of metal-free, sodium, calcium, magnesium, beryllium, cadmium, mercury and lead phthalocyanines and a stabilizer selected from the group consisting of metal-free, aluminum, chromium, iron, cobalt, nickel, copper, manganese and zinc phthalocyanines having from 1 to 4 substituents selected from the group consisting of nitro and chlorine with from about 60 to 100% sulfuric acid to bring said admixture into a state of fine dispersion, and pouring said admixture into water.

2. An improved process for the production of a solvent-stable alpha-modification of a metal-free phthalocyanine pigment which comprises treating an admixture of a member of the group consisting of metal-free, sodium, calcium, magnesium, beryllium, cadmium, mercury and lead phthalocyanines and a stabilizer selected from the group consisting of metal-free, aluminum, chromium, iron, cobalt, nickel, copper, manganese and zinc phthalocyanines having from 1 to 4 substituents selected from the group consisting of nitro and chlorine with from about 60 to 70% sulfuric acid to bring said admixture into a state of fine dispersion, and pouring said admixture into water.

3. An improved process for the production of a solvent-stable gamma-modification of a metal-free phthalocyanine pigment which comprises treating an admixture of a member of the group consisting of metal-free, sodium, calcium, magnesium, beryllium, cadmium, mercury and lead phthalocyanines and a stabilizer selected from the group consisting of metal-free, aluminum, chromium, iron, cobalt, nickel, copper, manganese and zinc phthalocyanines having from 1 to 4 substituents selected from the group consisting of nitro and chlorine with from about 75 to 100% sulfuric acid to bring said admixture into a state of fine dispersion, and pouring said admixture into water.

4. A solvent-stable phthalocyanine pigment comprising an intimate mixture of a member of the group consisting of alpha- and gamma-modifications of a metal-free phthalocyanine with a stabilizer of the group consisting of metal-free, aluminum, chromium, iron, cobalt, nickel, copper, manganese and zinc phthalocyanines having from 1 to 4 substituents selected from the group consisting of nitro and chlorine.

5. A solvent-stable phthalocyanine pigment as defined in claim 4 wherein there is one of said substituents for about 4 to 6 molecules of unsubstituted metal-free phthalocyanine.

6. A solvent-stable phthalocyanine pigment as defined in claim 4 wherein said stabilizer is present in a quantity of about 8 to 10% by weight of said metal-free phthalocyanine.

7. A solvent-stable phthalocyanine pigment consisting of an alpha-modified metal-free phthalocyanine in which a sufficient number of phthalocyanine molecules are substituted by from 1 to 4 chlorine substituents that there is one chlorine substituent for from about 4 to 6 unsubstituted phthalocyanine molecules.

8. A solvent-stable phthalocyanine pigment consisting of a gamma-modified metal-free phthalocyanine in which a sufficient number of phthalocyanine molecules are substituted by from 1 to 4 chlorine substituents that there is one chlorine substituent for from about 4 to 6 unsubstituted phthalocyanine molecules.

References Cited in the file of this patent

UNITED STATES PATENTS

| | | |
|---|---|---|
| 2,192,704 | Dahlen et al. | Mar. 5, 1940 |
| 2,613,128 | Baumann et al. | Oct. 7, 1952 |
| 2,615,027 | Bluemmel et al. | Oct. 21, 1952 |
| 2,618,642 | Keller et al. | Nov. 18, 1952 |

FOREIGN PATENTS

| | | |
|---|---|---|
| 1,116,429 | France | Feb. 6, 1956 |
| 890,109 | Germany | Sept. 17, 1953 |
| 911,997 | Germany | May 24, 1954 |